(12) United States Patent
Merrill

(10) Patent No.: US 8,849,998 B1
(45) Date of Patent: Sep. 30, 2014

(54) ESTIMATING POPULATION SEGMENTS

(75) Inventor: John W. Merrill, Redmond, WA (US)

(73) Assignee: Google Inc., Mountain View, CA (US)

( * ) Notice: Subject to any disclaimer, the term of this patent is extended or adjusted under 35 U.S.C. 154(b) by 7 days.

(21) Appl. No.: 13/410,108

(22) Filed: Mar. 1, 2012

(51) Int. Cl.
*G06F 15/173* (2006.01)

(52) U.S. Cl.
USPC .......................................... 709/224; 709/223

(58) Field of Classification Search
CPC ..... H04L 43/0876; H04L 67/02; H04L 67/22; G06Q 10/04; G06Q 30/02; G06Q 30/0201; G06Q 10/06
USPC .......................................................... 709/224
See application file for complete search history.

(56) References Cited

U.S. PATENT DOCUMENTS

| 8,005,833 B2* | 8/2011 | Adar et al. ................. 707/734 |
| 2010/0228850 A1* | 9/2010 | Fomitchev ................. 709/224 |
| 2011/0246641 A1* | 10/2011 | Pugh et al. ................. 709/224 |
| 2012/0324101 A1* | 12/2012 | Pecjack et al. ............. 709/224 |
| 2013/0198376 A1* | 8/2013 | Landa et al. ............... 709/224 |

* cited by examiner

*Primary Examiner* — Jonathan C Teixeira Moffat
*Assistant Examiner* — Eyob Hagos
(74) *Attorney, Agent, or Firm* — Fish & Richardson P.C.

(57) ABSTRACT

A method performed by one or more processing devices includes receiving a request to generate an estimate of a size of a population segment that accesses a resource; identifying, in demographic data, a number of counted users for the population segment; generating an estimate of a number of uncounted users in the population segment that access the resource; and generating, from the number of counted users and the number of uncounted users, the estimate of the size of the population segment.

21 Claims, 4 Drawing Sheets

ESTIMATING POPULATION SEGMENTS

BACKGROUND

A capture-recapture method is a type of method commonly used in ecology to estimate population size of a study area. The capture-recapture method may be used when a researcher fails to detect all animals present, within a population of interest, every time the researcher visits the study area. Additionally, the capture-recapture method is used in estimating a population size based on data from a single source, namely, the study area.

An example of the capture-recapture method is the Lincoln-Petersen method. In the Lincoln-Petersen method, a researcher visits a study area, captures animals and marks the animals captured. At another point in time, the researcher visits the study area again and recaptures animals. The researcher determines whether any of the recaptured animals are also marked. In this example, the Lincoln-Petersen method is used to estimate a population size of the animals in accordance with the below formula:

$$N = \frac{MC}{R},$$

where
N=Estimate of total population size;
M=Total number of animals captured and marked on the first visit;
C=Total number of animals captured on the second visit; and
R=Number of animals captured on the first visit that were then recaptured on the second visit.

SUMMARY

In one aspect of the present disclosure, a method performed by one or more processing devices includes receiving a request to generate an estimate of a size of a population segment that accesses a resource; identifying, in demographic data, a number of counted users for the population segment; generating an estimate of a number of uncounted users in the population segment that access the resource; and generating, from the number of counted users and the number of uncounted users, the estimate of the size of the population segment.

Implementations of the disclosure can include one or more of the following features. In some implementations, the demographic data includes first demographic data and second demographic data, and the method also includes receiving, from a first source, the first demographic data; and receiving, from a second source, the second demographic data. In other implementations, the method includes identifying, in the first demographic data, one or more first items of data that are associated with the population segment; and identifying, in the second demographic data, one or more second items of data that are associated with the population segment.

In other implementations, the method includes identifying, in the one or more first items, one or more items of data that is included in the one or more second items; wherein generating the estimate of the number of uncounted users is based on a number of the one or more items identified in the one or more first items that are included in the one or more second items. In still other implementations, the method includes identifying, in the one or more first items, an item of data that is associated with a first type of demographic data; identifying, in the one or more second items, that the item of data identified is associated with a second type of demographic data that differs from the first type of demographic data; and removing the item of data identified from the one or more first items and from the one or more second items.

In some implementations, the one or more first items include a first sample, the one or more second items include a second sample, and generating the estimate of the number of uncounted users includes: generating the estimate based on the first sample and the second sample. In still other implementations, the estimate of the size of the population segment is based on a probability distribution of $$P(n_0 = k|\pi_i, 1 \le i \le N) = \binom{k+n-1}{k-1}\left[\prod_{S \subset N}\left(\prod_{i \in S}\pi_i^{n_S}\right)\left(\prod_{i \notin S}(1-\pi_i)^{n_S}\right)\right]\left(\prod_{i<N}(1-\pi_i)^k\right).$$

In still another aspect of the disclosure, one or more machine-readable media are configured to store instructions that are executable by one or more processing devices to perform operations including receiving a request to generate an estimate of a size of a population segment that accesses a resource; identifying, in demographic data, a number of counted users for the population segment; generating an estimate of a number of uncounted users in the population segment that access the resource; and generating, from the number of counted users and the number of uncounted users, the estimate of the size of the population segment. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving a request to generate an estimate of a size of a population segment that accesses a resource; identifying, in demographic data, a number of counted users for the population segment; generating an estimate of a number of uncounted users in the population segment that access the resource; and generating, from the number of counted users and the number of uncounted users, the estimate of the size of the population segment. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated operations.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system that generates an estimate of a size of a population segment. Generally, a population segment includes a portion of a population associated with particular demographics. Generally, demographics include statistical characteristics of a population. Types of demographics include gender, race, age, disabilities, mobility, home ownership, employment status, geographic location, and so forth.

In an example, the system includes numerous users. In this example, the users may be assigned to various population segments, e.g., based on demographics of the users. For example, a population segment may include a portion of users of the system that are associated with particular demographics (e.g., males 21-28 years old). The system is configured to generate estimates of numbers of users in the various population segments.

Figure 1:
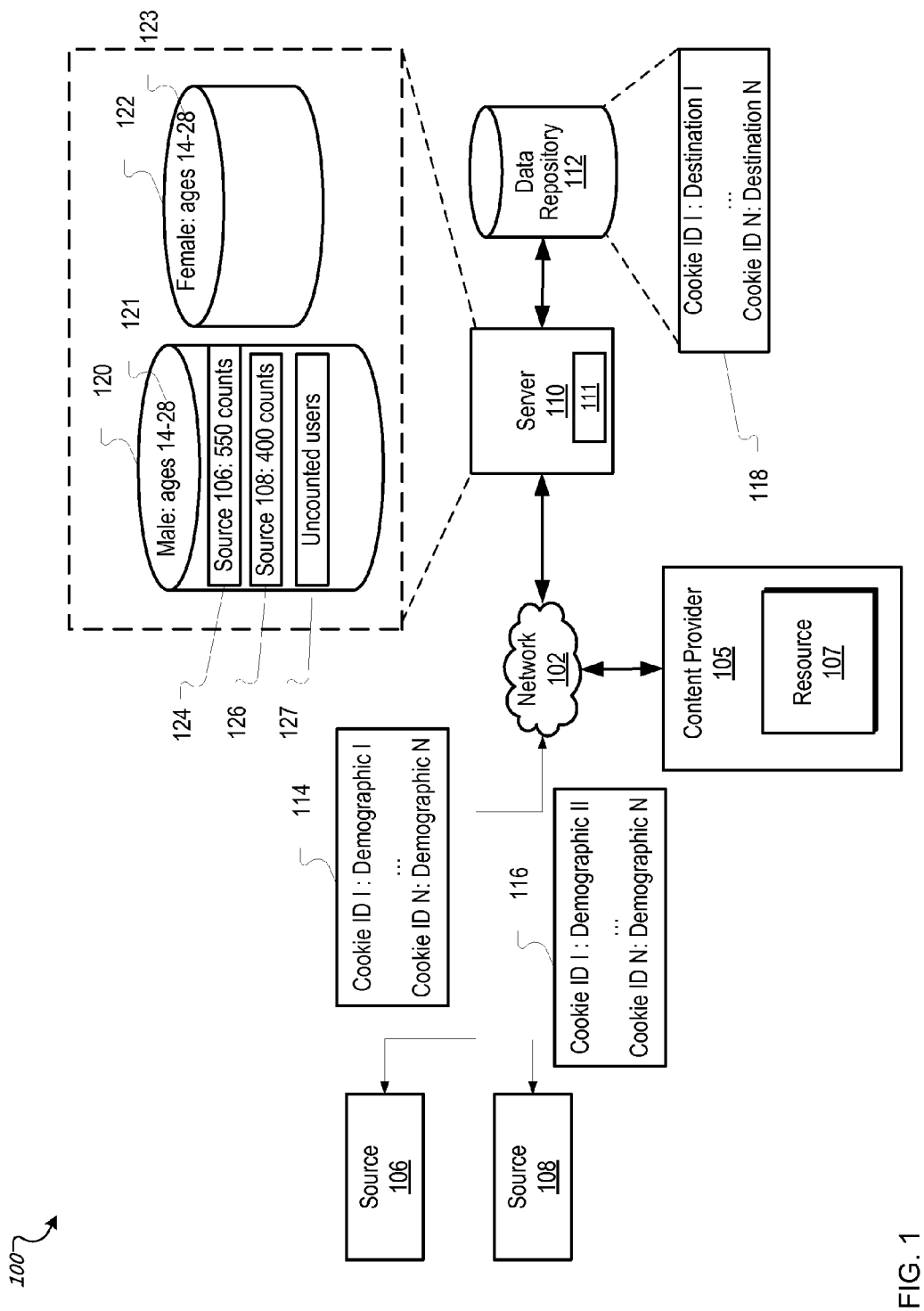
FIG. 1 is a diagram of an example of a network environment for estimating of a number of users in a population segment.

FIG. 1 is a diagram of an example of network environment 100 for estimating of a number of users in a population segment. Network environment 100 includes network 102, sources 106, 108, server 110, content provider 105 and data repository 112. Generally, a source includes a provider of data. In the example of FIG. 1, sources 106, 108 provide demographic data 114, 116 to server 110. Generally, demographic data includes data indicative of demographics of users.

Sources 106, 108 and content provider 105 can communicate with server 110 over network 102. Network environment 100 may include many thousands of data repositories, sources, content providers and servers, which are not shown. Server 110 may include various data engines, including, e.g., data engine 111. Although data engine 111 is shown as a single component in FIG. 1, data engine 111 can exist in one or more components, which can be distributed and coupled by network 102.

In the example of FIG. 1, content provider 105 hosts resource 107. Generally, a resource includes item(s) of data that can be provided over a network. Resources include surveys, HTML pages, web pages, websites, word processing documents, portable document format (PDF) documents, images, videos, applications, and so forth.

In an example, content provider 105 sends, to server 110, data indicative of population segments 121, 123 that are of interest to content provider 105. Population segment 121 includes a portion of users that are male, aged 21-28, and that access resource 107. Population segment 123 includes a portion of users that are female, aged 21-28, and that access resource 107. In an example, data engine 111 is configured to determine a size of population segments 121, 123 accessing resource 107.

In an example, data engine 111 generates an estimate of a size of population segment 121 by (i) identifying a number of counted users in population segment 121, and (ii) generating an estimate of a number of uncounted users 127 in population segment 121. Generally, a counted user includes a user that accessed resource 107, and for which data indicative of the user was included in demographic data 114, 116. Generally, an uncounted user includes a user that accessed resource 107, and for which data indicative of the user was excluded from demographic data 114, 116. Using the number of counted users and the number of uncounted users 127, data engine 111 generates an estimate of a number of users in population segment 121.

Data engine 111 determines a number of counted users for population segment 121 based on (i) destination data 118, and (ii) demographic data 114, 116. Generally, destination data includes data indicative of various destinations that have been visited by various users. Generally, a destination includes a location of resource 107 (e.g., a uniform resource location (URL) of resource 107).

In an example, data engine 111 uses cookies to collect destination data 118. In this example, data engine 111 sends a cookie (not shown) to a client device (not shown) of a user. The cookie may include an identifier (ID) that uniquely identifies the cookie. In this example, resource 107 includes a script that causes data to be transmitted to server 110, e.g., when resource 107 is accessed by the client device.

When the client device accesses resource 107, the script is executed, and the client device sends the cookie back to server 110. Using the cookie ID, data engine 111 updates destination data 118 with data indicative of a destination of resource 107 and the cookie ID. In the example of FIG. 1, destination data 118 includes associations between various cookie IDs (e.g., cookie ID I . . . cookie ID N) and various destinations of resources (e.g., destination I . . . destination N).

Demographic data 114, 116 is also associated with cookies, e.g., to promote associations among demographic data and users. For example, demographic data 114 includes associations between various cookie IDs (e.g., cookie ID I . . . cookie ID N) and demographic data (e.g., demographic I . . . demographic N). Demographic data 116 also includes associations between various cookie IDs (e.g., cookie ID II . . . cookie ID N) and demographic data (e.g., demographic I . . . demographic N).

In an example, sources 106, 108 are configured to use the cookies that were transmitted, to the client devices of users, by server 110. When a client device requests a resource (not shown) from one of sources 106, 108, the client device sends the cookie, with the request, to the one of sources 106, 108.

In an example, sources 106, 108 collect demographic data 114, 116 based on contents of the cookie. In this example, the cookie includes demographic data for a user. In another example, sources 106, 108 collect demographic data 114, 116 from a user's interaction with a resource hosted by sources 106, 108. For example, the user may fill out a survey with demographic data 114, 116. In this example, sources 106, 108 collect demographic data 114, 116 and associate demographic data 114, 116 with the cookie ID for the user.

In an example, content provider 105 may send to server 110 a request (not shown) for demographic data of population segments 121, 123 of users that are accessing resource 107. In response, data engine 111 generates bins 120, 122 for placement of demographic data 114, 116 associated with population segments 121, 123. Generally, a bin includes a data structure for placement of data. In this example of FIG. 1, bin 120 is associated with population segment 121. Bin 122 is associated with population segment 123.

In an example, bin 120 is populated with data indicative of a number of counted users in population segment 121. In populating bin 120 with a number of counted users, data engine 111 uses the destination of resource 107 in identifying users that have accessed resource 107. In this example, data engine 111 parses through destination data 118 to identify destinations of resource 107. Data engine 111 identifies, in destination data 118, cookie IDs that are associated with the identified destinations of resource 107.

In an example, demographic data 114, 116 includes cookie IDs for users that accessed resource 107 and other resources (not shown). In this example, data engine 111 is configured to identify, in demographic data 114, 116, users that have accessed resource 107. Data engine 111 selects items of demographic data 114, 116 that are associated with the cookie IDs identified in destination data 118.

For a selected item of demographic data, data engine 111 identifies one of population segments 121, 123 that is associated with the selected item of demographic data. In an example, an item of demographic data includes data (e.g., age and gender data) that can be used into identifying one of population segment 121, 123. Data engine 111 assigns the selected items of demographic data 114, 116 to bins 120, 122, e.g., based on which populations segments 121, 123 are associated with the items of demographic data 114, 116.

In an example, data in bins 120, 122 is further categorized into sub-bins, based on an identity of one of sources 106, 108 that transmitted the data to server 110. For example, bin 120 includes sub-bins 124, 126. Sub-bin 124 is for items of demographic data 114 received from source 106. Sub-bin 126 is for items of demographic data 116 received from source 108. When data engine 111 assigns an item of demographic data to bin 120, data engine 111 further assigns the item of demographic data to either sub-bin 124 or sub-bin 126.

Data engine 111 is also configured to identify overlapping items of demographic data. Generally, an overlapping item of data includes an item of data that is included in both of sub-bins 124, 126. In an example, data engine 111 identifies overlapping items of demographic data 114, 116 by determining whether sub-bins 124, 126 include a same item of demographic data 114, 116. Data engine 111 uses the overlapping items of data in generating an estimate of uncounted users 127, e.g., as described in further detail below.

Data engine 111 also identifies items of demographic data 114, 116 that are inconsistently labeled by sources 106, 108. In an example, an item of demographic data is inconsistently labeled when source 106 associates a cookie ID with a particular type of demographic data, and source 108 associates the same cookie ID with a different type of demographic data. In this example, sources 106, 108 have inconsistently identified a demographic of a user associated with the cookie ID.

In the example of FIG. 1, an item of demographic data includes cookie ID I. In this example, source 106 labels cookie ID I with a particular type of demographic data, shown as Demographic I. Source 106 labels cookie ID I with a different type of demographic data, shown as Demographic II. Based on the inconsistent labeling of cookie ID I, data engine 111 removes the item of demographic data, associated with cookie ID I, from sub-bins 124, 126.

Following removal of inconsistently labeled items of data, data engine 111 determines a number of counted users for sub-bins 124, 126. The number of counted users for sub-bins 124, 126 is indicative of a number of unique users, for population segment 121, that have been identified in demographic data 114, 116 as accessing resource 107. In another example, data engine 111 removes overlapping items of data.

In the example of FIG. 1, data engine 111 determines five-hundred fifty counted users in sub-bin 124 and four-hundred counted users in sub-bin 126. In this example, data engine 111 determines that population segment 121 includes nine-hundred fifty counted users.

Using the number of counted users, data engine 111 generates an estimate of uncounted users 127 for population segment 121. Data engine 111 is configured to generate an estimate of uncounted users 127 based on a negative binomial distribution. Generally, a negative binomial distribution includes a discrete probability distribution of a number of successes in a sequence of trials before an occurrence of a specified (non-random) number of failures.

In this example, data engine 111 implements a series of instructions that use the following variables. $A_i$ includes samples from a population of visitors to a destination D (e.g., resource 107). In this example, $A_i$ may include the items of data included in one of sub-bins 124, 126. To promote estimation of a number of uncounted users 127, data engine 111 generates sub-bins 124, 126 such that $A_i$ includes samples from numerous, different sources.

A sample $A_i$ is drawn from the population of users of network system 100 with unknown probability $\pi_i$. In this example, $n_i$ includes a number of elements in $A_i$. For a set, $S \subset N$, let $n_S = \cap_{i \in S} A_i$. In this example, n denotes the number of samples in a union of samples. Additionally, $n_S$ includes a value indicative of a number of overlapping items of data, e.g., as described above.

In this example, data engine 111 is configured to generate an estimate for $n_0$, the number of vistors to D not included in samples $A_i$. In this example, uncounted users 127 includes a value for $n_0$ In an example, data engine 111 generates a value for $n_0$ in accordance with the probability distribution shown in the below Table 1:

TABLE 1

$$P(n_0 = k | \pi_j | \leq i \leq N) = \binom{k+n-1}{k-1} \left[ \prod_{S \subset N} \left( \prod_{i \in S} \pi_i^{n_S} \right) \left( \prod_{i \notin S} (1-\pi_i)^{n_S} \right) \right] \left( \prod_{i < N} (1-\pi_i)^k \right).$$

As shown in the above Table 1, the variable k follows a negative binomial distribution. In an example, the variable k includes a random variable. The distribution $P(n_0=k)$ includes a probably that k is the number of uncounted users, e.g., $n_0$. In an example, the number of uncounted users also corresponds to an unknown population size, e.g., when the number of counted users is small relative to the number of uncounted users.

In this example, data engine 111 is configured to generate a value of k to maximize $P(n_0=k)$. The value of k includes an estimate of $n_0$, the number of uncounted users and/or the unknown population size.

In this example, data engine 111 is configured to compute a value for $n_0$ by taking a partial derivative of $l(k, \vec{\pi})=\log(P(k, \vec{\pi}))$ in accordance with the formula shown in the below Table 2:

TABLE 2

$$\frac{\partial l}{\partial k} = \Psi(k+n) - \Psi(k) + \sum_{i<N} \log(1-\pi_i^{(m)}).$$

In the above Table 2, ψ denotes Gauss' digamma function. Data engine 111 computes a solution of the formula shown in Table 2. The solution is shown in the below Table 3:

TABLE 3

$$\pi_i^{(m+1)} = \frac{n_i}{n + k^{(m+1)}}.$$

The above Table 3 shows an equation to estimate $\pi_i$, the unknown parameter for the negative binomial distribution of A, e.g., after data engine 111 generates a solution for k. In an example, data engine 111 applies the equation in Table 3 for each i, e.g., to generate $\pi_i$ for each $A_i$.

In accordance with the formula in the above Table 3, $n_0$ includes a value indicative of a number of users that visited resource 107 but for which no demographic data was included in demographic data 114, 116. In this example, uncounted users 127 include the value of $n_0$. In this example, data engine 111 generates an estimate of a number of users in population segment 121 by generating a summation of the number of counted users in sub-bins 124, 126 and the number of uncounted users 127.

Figure 2:
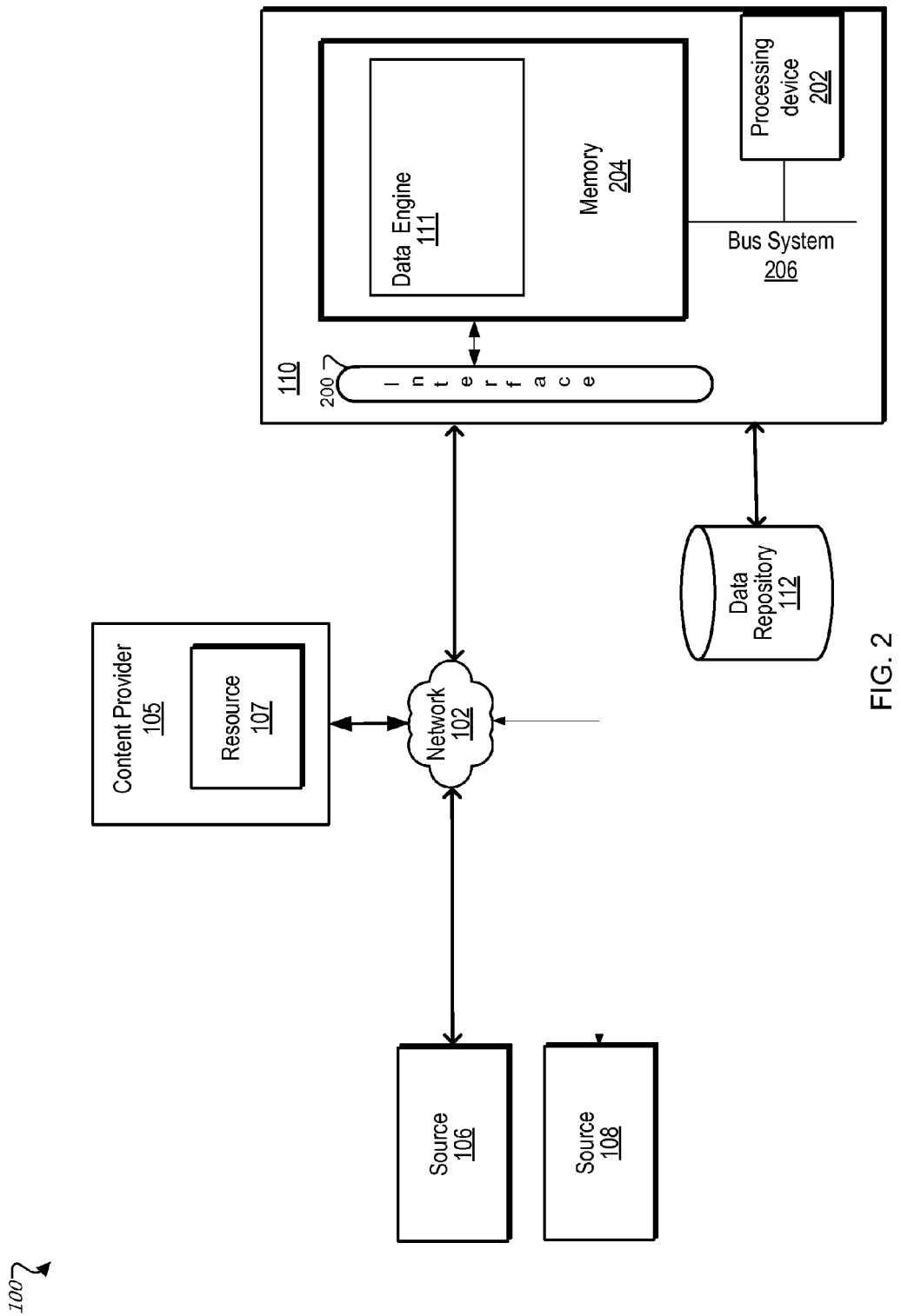
FIG. 2 is a block diagram showing examples of components of a network environment for estimating of a number of users in a population segment.

FIG. 2 is a block diagram showing examples of components of network environment 100 for estimating of a number of users in population segment 121. In the example of FIG. 2, bins 120, 122, contents of bin 120, contents of data repository 112, and demographic data 114, 116 are not shown.

One or more of sources 106, 108 can be a computing device capable of taking input from a user and communicating over network 102 with server 110 and/or with other computing devices. For example, one of sources 106, 108 can be a mobile device, a desktop computer, a laptop, a cell phone, a personal digital assistant (PDA), a server, an embedded computing system, a mobile device, and the like. Network environment 100 can include a plurality of computing devices, which can be geographically dispersed.

Network 102 can include a large computer network, including, e.g., a local area network (LAN), wide area network (WAN), the Internet, a cellular network, or a combination thereof connecting a number of mobile computing devices, fixed computing devices, and server systems. The network(s) may provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver: In addition, short-range communication may occur, including, e.g., using a Bluetooth, WiFi, or other such transceiver.

Server 110 can be a variety of computing devices capable of receiving data and running one or more services. In an example, server 110 can include a server, a distributed computing system, a desktop computer, a laptop, a cell phone, a rack-mounted server, and the like. Server 110 can be a single server or a group of servers that are at a same location or at different locations. Sources 106, 108 and server 110 can run programs having a client-server relationship to each other. Although distinct modules are shown in the figures, in some examples, client and server programs can run on the same device.

Content provider 105 can be a variety of computing devices capable of receiving data and running one or more services. In an example, content provider 105 can include a server, a distributed computing system, a desktop computer, a laptop, a cell phone, a rack-mounted server, and the like.

Server 110 can receive data from sources 106, 108 and content provider 105 (and/or from data repository 112) through input/output (I/O) interface 200. I/O interface 200 can be a type of interface capable of receiving data over a network, including, e.g., an Ethernet interface, a wireless networking interface, a fiber-optic networking interface, a modem, and the like. Server 110 also includes a processing device 202 and memory 204. A bus system 206, including, for example, a data bus and a motherboard, can be used to establish and to control data communication between the components of server 110.

Processing device 202 can include one or more microprocessors. Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 111. Data engine 111 can be implemented in software running on a computer device (e.g., server 110), hardware or a combination of software and hardware.

Figure 3:
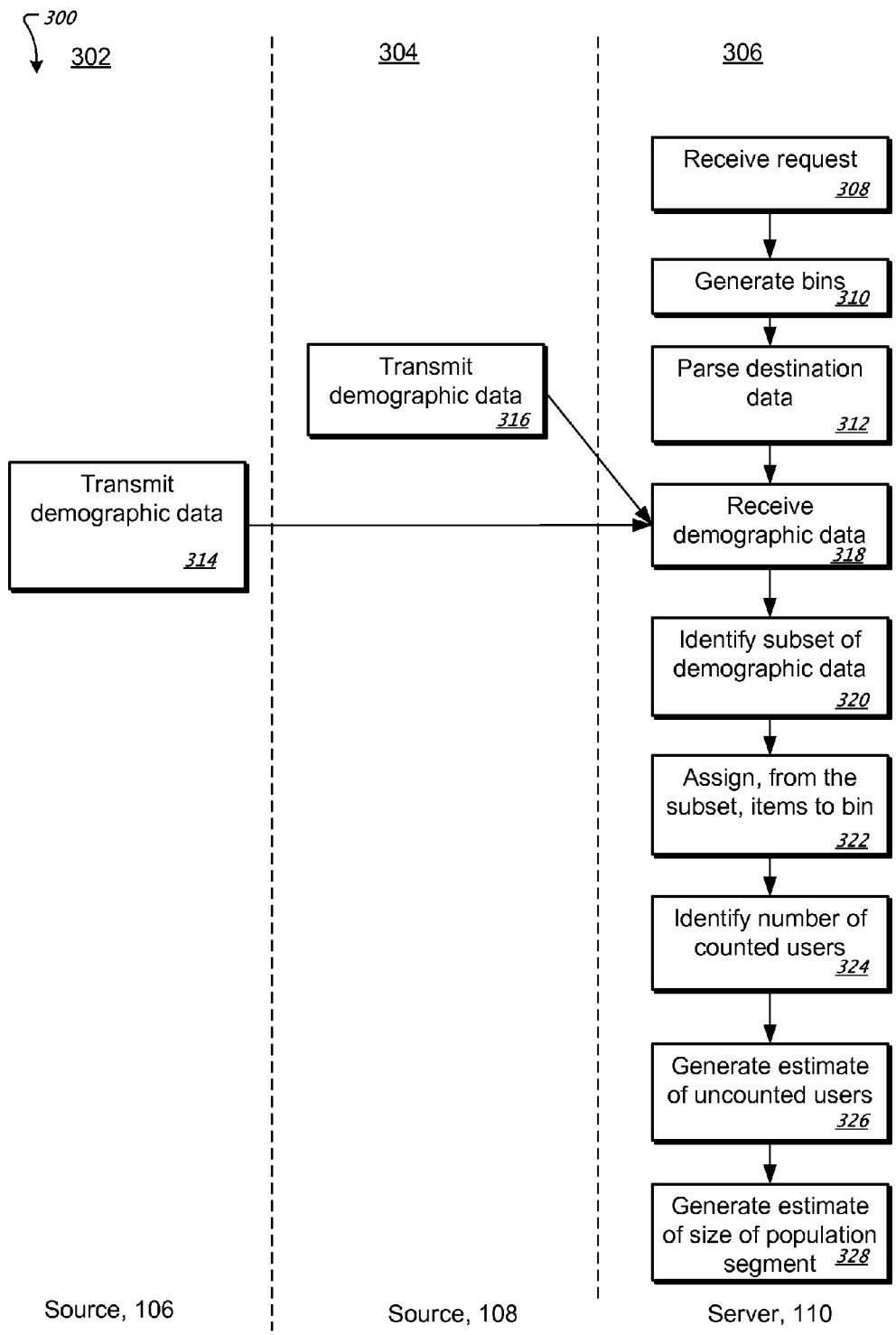
FIG. 3 is a flowchart showing a process for estimating of a number of users in a population segment.

FIG. 3 is a flowchart showing an example process 300 for estimating of a number of users in population segment 121. In FIG. 3, process 300 is split into a left part 302, which is performed on source 106, a center part 304, which is performed on source 108, and a right part 306, which is performed on server 110.

In operation, data engine 111 receives (308) a request (not shown). In this example, the request is transmitted from content provider 105. The request is for an estimate of a size of population segment 121 that accesses resource 107. In response to the request, data engine 111 generates (310) bins 120, 122, e.g., in accordance with population segments 121, 123. In an example, data engine 111 generates bins for types of population segments 121, 123 specified by content provider 105. Data engine 111 also generates sub-bins 124, 126 to promote categorization of demographic data 114, 116 by sources 106, 108.

Data engine 111 identifies (not shown) a destination of resource 107. In an example, data engine 111 identifies the destination by identifying a URL for resource 107. Using the destination of resource 107, data engine 111 parses (312) destination data 118 for cookie IDs that are associated with the destination.

In the example of FIG. 1, source 106 transmits (314) demographic data 114 to server 110. Source 106 also transmits (316) demographic data 116 to server 110. Server 110 receives (318) demographic data 114, 116. Using the identified cookie IDs from destination data 118, data engine 111 identifies (320) a subset of demographic data 114, 116.

In an example, the subset includes items of data (e.g., from demographic data 114, 116) that are associated with the cookie IDs identified in destination data 118. In this example, the subset includes items of demographic data 114, 116 for users that have accessed resource 107.

Data engine 111 assigns (322) the items in the subset to one of bins 120, 122. As previously described, data engine 111 assigns items to bins 120, 122 based on population segments that are associated with the items. In an example, an item is assigned to bin 120. In this example, data engine 111 further assigns the item to one of sub-bins 124, 126, e.g., based on which one of sources 106, 108 transmitted the item to server 110.

Data engine 111 identifies (324) a number of counted users in sub-bins 124, 126. In an example, data engine 111 removes from sub-bins 124, 126 inconsistently labeled items of data. For the items of data remaining in sub-bins 124, 126, data engine 111 identifies a number of counted users in sub-bins 124, 126. Using the number of counted users, data engine 111 generates (326) an estimate of uncounted users 127. In an example, data engine 111 generates a number of uncounted users 127 in accordance with the formulas shown in the above Tables 1-3.

In the example of FIG. 1, data engine 111 generates (328) an estimate of a size of population segment 121. In this example, data engine 111 generates the estimate based on a summation of a number of counted users in sub-bins 124, 126 and a number of uncounted users 127.

Using the techniques described herein, a system is configured to generate an estimate of a size of population segment. The system generates the estimate based on a number of counted users and a number of uncounted users.

Figure 4:
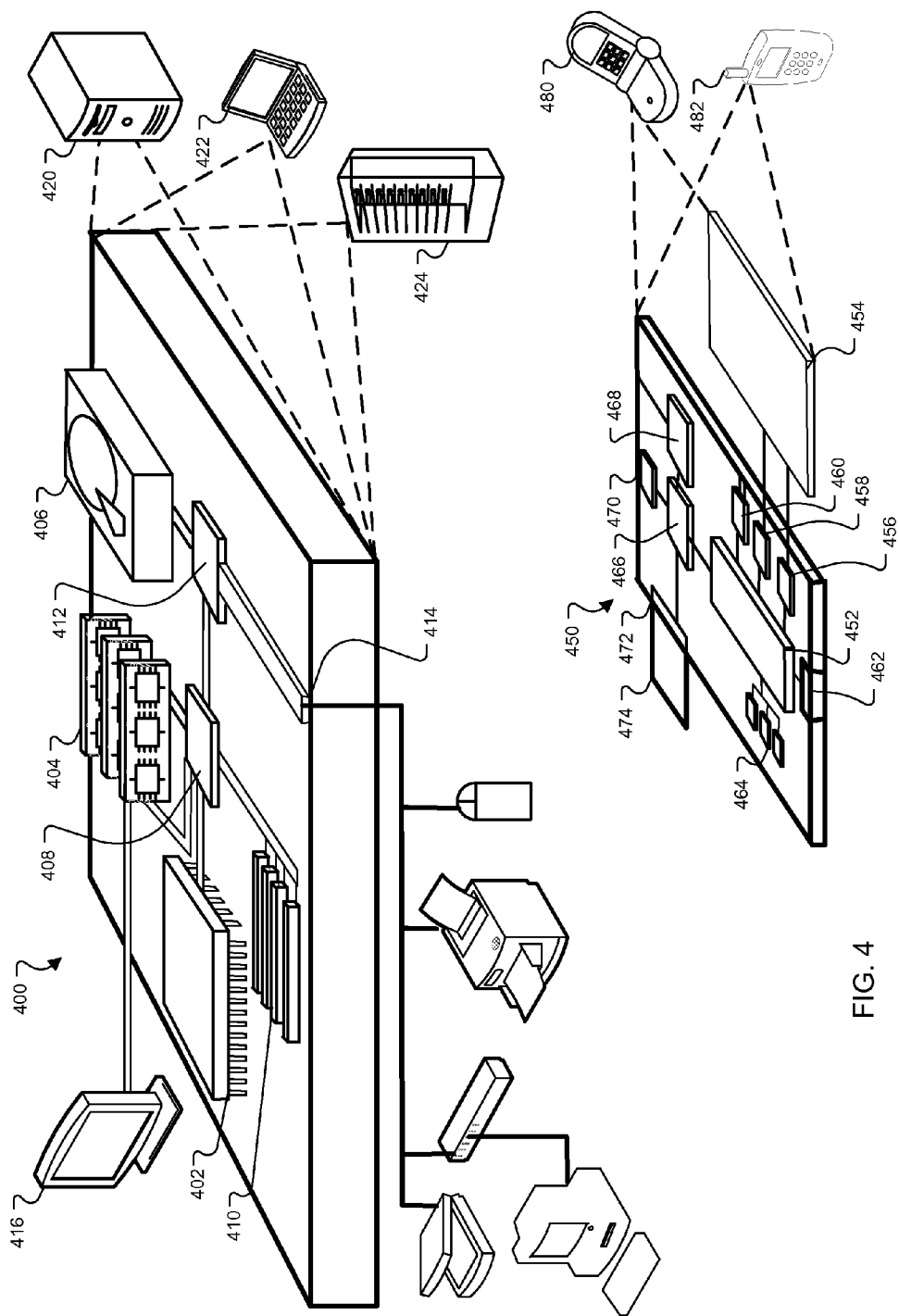
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores data within computing device 400. In one implementation, memory 404 is a volatile memory unit or units. In another implementation, memory 404 is a non-volatile memory unit or units. Memory 404 also can be another form of computer-readable medium, such as a magnetic or optical disk.

Storage device 406 is capable of providing mass storage for computing device 400. In one implementation, storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, such as those described above. The data carrier is a computer- or machine-readable medium, such as memory 404, storage device 406, memory on processor 402, and the like.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer such as laptop computer 422. In some examples, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes processor 452, memory 464, an input/output device such as display 454, communication interface 466, and transceiver 468, among other components. Device 450 also can be provided with a storage device, such as a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, such as control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores data within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can include secure data also. Thus, for example, expansion memory 474 can be provide as a security module for device 450, and can be programmed with instructions that permit secure use of device 450. In addition, secure applications can be provided via the SIMM cards, along with additional data, such as placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, such as those described above. The data carrier is a computer- or machine-readable medium, such as memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken data from a user and convert it to usable digital data. Audio codec 460 can likewise generate audible sound for a user, such as through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein collect personal data about users, the users may be provided with an opportunity to opt in/out of programs or features that may collect personal data (e.g., data about a user's preferences or a user's current location). In addition, particular data may be anonymized in one or more ways before it is stored or used, so that personally identifiable data is removed. For example, a user's identity may be anonymized so that no personally identifiable data can be determined for the user, or a user's geographic location may be generalized where location data is obtained (e.g., to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that data about a party is publicly known before divulging that data to another party, or even before incorporating that data into a social graph.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more processing devices, comprising:
   receiving a request to generate an estimate of a size of a population segment that accesses a resource;
   identifying, in demographic data, a number of counted users for the population segment;
   generating an estimate of a number of uncounted users in the population segment that access the resource within a specified period of time, wherein the estimate of the number of uncounted users includes an estimate of a number of unidentified users in the population segment that have accessed the resource in the past for which no demographic data was available or otherwise stored in association with the access; and
   generating, from the number of counted users and the number of uncounted users, the estimate of the size of the population segment.

2. The method of claim 1, wherein the demographic data comprises first demographic data and second demographic data, and wherein the method further comprises:
   receiving, from a first source, the first demographic data; and
   receiving, from a second source, the second demographic data.

3. The method of claim 2, further comprising:
   identifying, in the first demographic data, one or more first items of data that are associated with the population segment; and
   identifying, in the second demographic data, one or more second items of data that are associated with the population segment.

4. The method of claim 3, further comprising:
   identifying, in the one or more first items, one or more items of data that is included in the one or more second items;
   wherein generating the estimate of the number of uncounted users is based on a number of the one or more items identified in the one or more first items that are included in the one or more second items.

5. The method of claim 3, further comprising:
   identifying, in the one or more first items, an item of data that is associated with a first type of demographic data;
   identifying, in the one or more second items, that the item of data identified is associated with a second type of demographic data that differs from the first type of demographic data; and
   removing the item of data identified from the one or more first items and from the one or more second items.

6. The method of claim 3, wherein the one or more first items comprise a first sample, the one or more second items comprise a second sample, and wherein generating the estimate of the number of uncounted users comprises:
   generating the estimate based on the first sample and the second sample.

7. The method of claim 1, wherein the estimate of the size of the population segment is based on a probability distribution of $$P(n_0 = k | \pi_i, 1 \leq i \leq N) = \binom{k+n-1}{k-1} \left[ \prod_{S \subset N} \left( \prod_{i \in S} \pi_i^{n_S} \right) \left( \prod_{i \in S} (1-\pi_i)^{n_S} \right) \right] \left( \prod_{i < N} (1-\pi_i)^k \right);$$

wherein k is a random variable;
   wherein $\pi_i$ is an unknown probability value;
   wherein $n_0$ is the number of uncounted users;
   wherein N is the number of counted users for the population segment;
   wherein S is a subset of N;
   wherein i is an integer value; and
   wherein n is a number of samples in a union of samples.

8. One or more machine-readable media configured to store instructions that are executable by one or more processing devices to perform operations comprising:
   receiving a request to generate an estimate of a size of a population segment that accesses a resource;
   identifying, in demographic data, a number of counted users for the population segment;
   generating an estimate of a number of uncounted users in the population segment that access the resource within a specified period of time, wherein the estimate of the number of uncounted users includes an estimate of a number of unidentified users in the population segment that have accessed the resource in the past for which no demographic data was available or otherwise stored in association with the access; and
   generating, from the number of counted users and the number of uncounted users, the estimate of the size of the population segment.

9. The one or more machine-readable media of claim 8, wherein the demographic data comprises first demographic data and second demographic data, wherein the operations further comprise:
   receiving, from a first source, the first demographic data; and
   receiving, from a second source, the second demographic data.

10. The one or more machine-readable media of claim 9, wherein the operations further comprise:
    identifying, in the first demographic data, one or more first items of data that are associated with the population segment; and
    identifying, in the second demographic data, one or more second items of data that are associated with the population segment.

11. The one or more machine-readable media of claim 10, wherein the operations further comprise:
    identifying, in the one or more first items, one or more items of data that is included in the one or more second items;
    wherein generating the estimate of the number of uncounted users is based on a number of the one or more items identified in the one or more first items that are included in the one or more second items.

12. The one or more machine-readable media of claim 10, wherein the operations further comprise:
    identifying, in the one or more first items, an item of data that is associated with a first type of demographic data;
    identifying, in the one or more second items, that the item of data identified is associated with a second type of demographic data that differs from the first type of demographic data; and removing the item of data identified from the one or more first items and from the one or more second items.

13. The one or more machine-readable media of claim 10, wherein the one or more first items comprise a first sample, the one or more second items comprise a second sample, and wherein generating the estimate of the number of uncounted users comprises:
generating the estimate based on the first sample and the second sample.

14. The one or more machine-readable media of claim 8, wherein the estimate of the size of the population segment is based on a probability distribution of $$P(n_0 = k | \pi_i, 1 \leq i \leq N) = \binom{k+n-1}{k-1} \left[ \prod_{S \subset N} \left( \prod_{i \in S} \pi_i^{n_S} \right) \left( \prod_{i \notin S} (1-\pi_i)^{n_S} \right) \right] \left( \prod_{i < N} (1-\pi_i)^k \right);$$

wherein k is a random variable;
wherein $\pi_i$ is an unknown probability value;
wherein $n_0$ is the number of uncounted users;
wherein N is the number of counted users for the population segment;
wherein S is a subset of N;
wherein i is an integer value; and
wherein n is a number of samples in a union of samples.

15. An electronic system comprising:
one or more processing devices; and
one or more machine-readable media configured to store instructions that are executable by the one or more processing devices to perform operations comprising:
receiving a request to generate an estimate of a size of a population segment that accesses a resource;
identifying, in demographic data, a number of counted users for the population segment;
generating an estimate of a number of uncounted users in the population segment that access the resource within a specified period of time, wherein the estimate of the number of uncounted users includes an estimate of a number of unidentified users in the population segment that have accessed the resource in the past for which no demographic data was available or otherwise stored in association with the access; and
generating, from the number of counted users and the number of uncounted users, the estimate of the size of the population segment.

16. The electronic system of claim 15, wherein the demographic data comprises first demographic data and second demographic data, wherein the operations further comprise:
receiving, from a first source, the first demographic data; and
receiving, from a second source, the second demographic data.

17. The electronic system of claim 16, wherein the operations further comprise:
identifying, in the first demographic data, one or more first items of data that are associated with the population segment; and
identifying, in the second demographic data, one or more second items of data that are associated with the population segment.

18. The electronic system of claim 17, wherein the operations further comprise:
identifying, in the one or more first items, one or more items of data that is included in the one or more second items;
wherein generating the estimate of the number of uncounted users is based on a number of the one or more items identified in the one or more first items that are included in the one or more second items.

19. The electronic system of claim 17, wherein the operations further comprise:
identifying, in the one or more first items, an item of data that is associated with a first type of demographic data;
identifying, in the one or more second items, that the item of data identified is associated with a second type of demographic data that differs from the first type of demographic data; and
removing the item of data identified from the one or more first items and from the one or more second items.

20. The electronic system of claim 17, wherein the one or more first items comprise a first sample, the one or more second items comprise a second sample, and wherein generating the estimate of the number of uncounted users comprises:
generating the estimate based on the first sample and the second sample.

21. The electronic system of claim 15, wherein the estimate of the size of the population segment is based on a probability distribution of $$P(n_0 = k | \pi_i, 1 \leq i \leq N) = \binom{k+n-1}{k-1} \left[ \prod_{S \subset N} \left( \prod_{i \in S} \pi_i^{n_S} \right) \left( \prod_{i \notin S} (1-\pi_i)^{n_S} \right) \right] \left( \prod_{i < N} (1-\pi_i)^k \right);$$

wherein k is a random variable;
wherein $\pi_i$ is an unknown probability value;
wherein $n_0$ is the number of uncounted users;
wherein N is the number of counted users for the population segment;
wherein S is a subset of N;
wherein i is an integer value; and
wherein n is a number of samples in a union of samples.

* * * * *